(12) United States Patent
Gorokhov

(10) Patent No.: US 8,599,799 B2
(45) Date of Patent: Dec. 3, 2013

(54) METHOD OF IMPROVING THROUGHPUT IN A SYSTEM INCLUDING PERSISTENT ASSIGNMENTS

(75) Inventor: Alexei Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1007 days.

(21) Appl. No.: 11/846,984

(22) Filed: Aug. 29, 2007

(65) Prior Publication Data

US 2007/0291691 A1    Dec. 20, 2007

Related U.S. Application Data

(63) Continuation-in-part of application No. 11/437,449, filed on May 18, 2006.

(60) Provisional application No. 60/841,782, filed on Aug. 31, 2006, provisional application No. 60/840,109, filed on Aug. 25, 2006.

(51) Int. Cl.
*H04B 7/212* (2006.01)

(52) U.S. Cl.
USPC ........... 370/337; 370/329; 370/330; 370/335; 370/336

(58) Field of Classification Search
None
See application file for complete search history.

(56) References Cited

U.S. PATENT DOCUMENTS

| | | | |
|---|---|---|---|
| 6,453,151 B1 | 9/2002 | Kiang et al. | |
| 6,459,901 B1 * | 10/2002 | Chawla et al. | 455/450 |
| 7,864,740 B2 | 1/2011 | Yang et al. | |
| 2005/0130663 A1 | 6/2005 | Hong et al. | |
| 2005/0165949 A1 * | 7/2005 | Teague | 709/236 |
| 2005/0238053 A1 | 10/2005 | Iochi et al. | |
| 2006/0034173 A1 * | 2/2006 | Teague et al. | 370/235 |
| 2006/0291393 A1 * | 12/2006 | Teague et al. | 370/235 |
| 2007/0097927 A1 * | 5/2007 | Gorokhov et al. | 370/335 |
| 2007/0124062 A1 | 5/2007 | Janky et al. | |
| 2007/0217370 A1 * | 9/2007 | Soong et al. | 370/337 |
| 2007/0271568 A1 | 11/2007 | Gorokhov | |
| 2009/0022098 A1 * | 1/2009 | Novak et al. | 370/329 |
| 2009/0060081 A1 | 3/2009 | Zhang et al. | |
| 2009/0219887 A1 | 9/2009 | Barriac | |

FOREIGN PATENT DOCUMENTS

| | | |
|---|---|---|
| CN | 1419789 | 5/2003 |
| DE | 10014396 A1 | 4/2001 |
| EP | 0619662 A2 | 10/1994 |
| EP | 0905922 | 3/1999 |
| JP | 7099499 A | 4/1995 |
| JP | 11055179 | 2/1999 |

(Continued)

OTHER PUBLICATIONS

International Search Report—PCT/US07/077426, International Search Authority—European Patent Office, Feb. 20, 2008.

(Continued)

*Primary Examiner* — Jae Y Lee
(74) *Attorney, Agent, or Firm* — Donald C. Kordich

(57) ABSTRACT

Methods and systems are disclosed that provide conditional assignments to access terminals over resources assigned to other access terminals. A plurality of resources having persistent assignments to the other access terminals are processed to determine a gap in transmissions. The resources that can be conditionally utilized by the access terminals are determined and a signal indicative of such conditionally assigned resources is transmitted. The access terminals receive the signal and accordingly utilize the conditionally assigned resources.

44 Claims, 12 Drawing Sheets

(56) References Cited

FOREIGN PATENT DOCUMENTS

| | | |
|---|---|---|
| JP | 2003514485 A | 4/2003 |
| JP | 2004104461 A | 4/2004 |
| JP | 2004343258 | 12/2004 |
| JP | 2008507904 | 3/2008 |
| RU | 2073913 | 2/1997 |
| WO | WO9205556 | 4/1992 |
| WO | WO9501706 A1 | 1/1995 |
| WO | WO0137451 | 5/2001 |
| WO | 0172061 A1 | 9/2001 |
| WO | WO2006020030 | 2/2006 |
| WO | 2006138379 A2 | 12/2006 |
| WO | 2007050828 A1 | 5/2007 |
| WO | 2007143363 A2 | 12/2007 |

OTHER PUBLICATIONS

Written Opinion of the Internatinal Searching Authority, PCT/US2007/077426, European Patent Office Feb. 20, 2008.

Yoon C. S., "Introduction of WiBro MAC Specification", Oct. 25, 2005.

Taiwan Search Report—TW096132646—TIPO—Feb. 22, 2012.

* cited by examiner

| b1 | b5 | b9 | b13 | b17 | b21 | b25 | b29 |
| --- | --- | --- | --- | --- | --- | --- | --- |
| b2 | b6 | b10 | b14 | b18 | b22 | b26 | b30 |
| b3 | b7 | b11 | b15 | b19 | b23 | b27 | b31 |
| b4 | b8 | b12 | b16 | b20 | b24 | b28 | b32 |

FIG. 6

METHOD OF IMPROVING THROUGHPUT IN A SYSTEM INCLUDING PERSISTENT ASSIGNMENTS

CROSS-REFERENCE TO RELATED APPLICATION(S)

This application is a continuation in part of U.S. patent application Ser. No. 11/437,449 filed on May 18, 2006 and entitled "A METHOD OF IMPROVING THROUGHPUT IN A SYSTEM INCLUDING STICKY ASSIGNMENTS" and claims the benefit of U.S. Provisional Patent Application Ser. No. 60/841,782 filed on Aug. 31, 2006 and entitled "A METHOD OF IMPROVING THROUGPUT IN A SYSTEM INCLUDING PERSISTENT ASSIGNMENTS", and U.S. Provisional Patent Application Ser. No. 60/840,109 filed on Aug. 25, 2006 and entitled "CDMA WIRELESS COMMUNICATION SYSTEMS", the entireties of these applications are incorporated herein by reference.

BACKGROUND OF THE INVENTION

The present document generally relates to wireless communications and to assignments within the wireless communication systems.

Wireless communication systems are widely deployed to provide various types of communications such as voice, data, video and so on. These systems may be multiple-access systems capable of supporting communication with multiple access terminals by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems. Typically, a wireless communication system comprises several base stations, wherein each base station communicates with the mobile station using a forward link and each mobile station (or access terminal) communicates with base station using a reverse link.

Generally, when a transmitter of an access point (AP) or an Access Terminal (AT) completes transmitting a set of actual data, a break (also referred to as "a gap") in transmission occurs before transmitting another set of actual data packets. The gap in data transmission refers to duration of time when no actual data is transmitted on the assigned resource. In a typical communication system, in the case of the access point transmitter, a possibility exists that the gap in transmission may be construed as a loss of the assigned resource. In this case, those resources are lost and bandwidth that is available is not fully utilized. Further, the gap in transmission may be interpreted as an indication that the assigned resources have been deassigned. In both cases, the bandwidth is not optimally utilized and may lower the quality and reliability of the communication system.

SUMMARY OF THE INVENTION

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

A method of communication according to various aspects described herein provides for determining a plurality of resources subject to conditional assignments, or conditional users eligible to use the conditionally assigned resources or a combination thereof. Accordingly, a signal indicative of the plurality of resources subject to the conditional assignments to be utilized by at least one conditional user is generated and transmitted to the user thereby facilitating utilization of conditionally assigned resources.

According to various aspects, the signal comprises one or more of a bit map or a no-information signal. The bit map is generated such that each location of the map corresponds to one of the resources subject to the conditional assignment that is to be utilized by the at least one conditional user. The bit map can be transmitted to the access terminals that utilize resources conditionally based on the received bit map. A no-information signal can also be transmitted in lieu of or in addition to the bit map. The no-information signal can identify one or more of the access terminals for the persistent assignments, the sector or access point that is transmitting the no information signal or the access terminals that are subject to the conditional assignments.

A communication system in accordance with various aspects described herein provides for conditionally allocating resources to users/access terminals and communication of such allocations. The communication system comprises a processor configured to generate a signal indicative of which of a plurality of resources subject to conditional assignments are to be utilized by at least one conditional user and instruct transmission of the signal. The processor generates a map such that each location of the map corresponds to one of the resources subject to the conditional assignments that are to be utilized by the at least one conditional user. In accordance with other aspects, the processor can also generate a no-information signal such as an erasure signature packet in lieu of or in addition to the map utilized for communicating conditional assignments.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

BRIEF DESCRIPTION OF THE DRAWINGS

FIG. 6 shows an illustration of bit-map for indicating utilization of conditional assignments.

DESCRIPTION OF THE INVENTION

Figure 1:
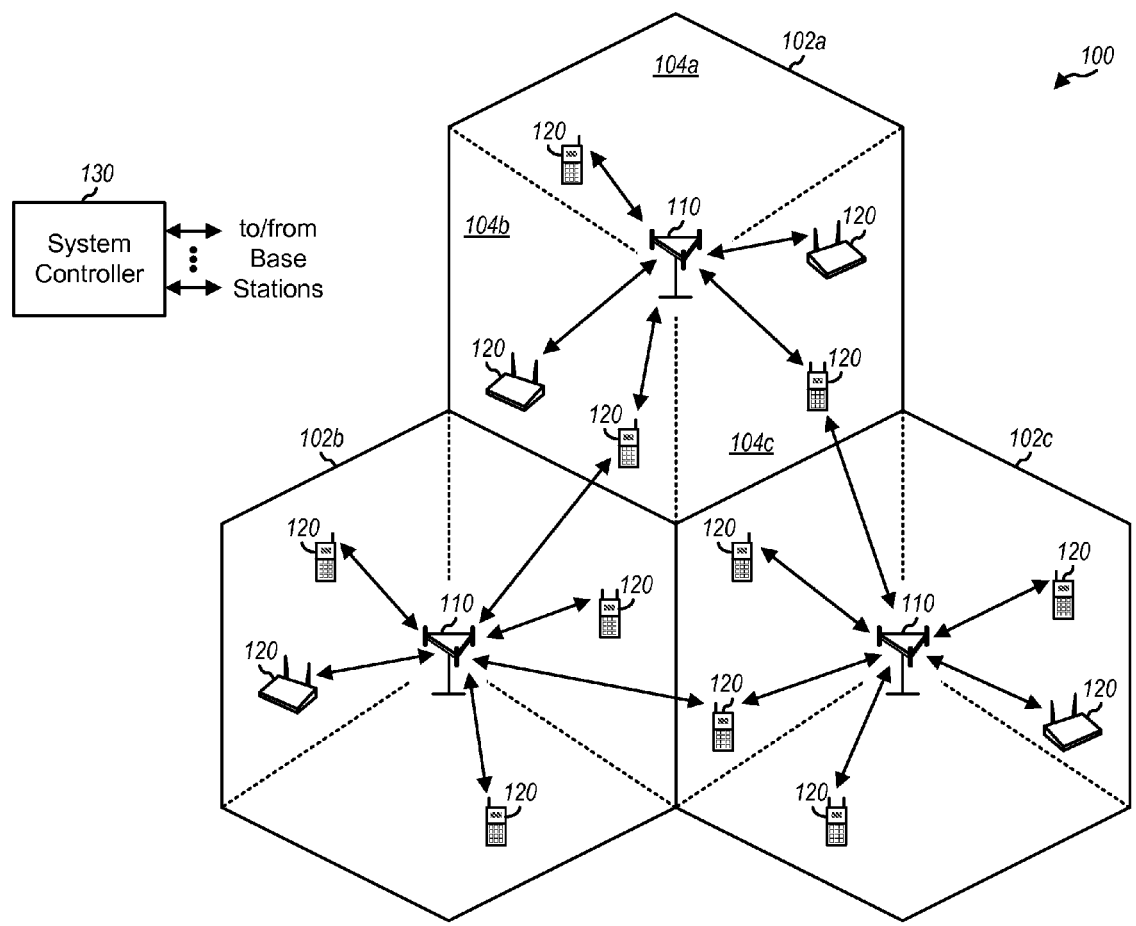
FIG. 1 illustrates a wireless multiple-access communication system in accordance with various aspects set forth herein.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident however, that such embodiment(s) may be practiced without these specific details. In other instances, well-known structures and devices are shown in block diagram form in order to facilitate describing one or more embodiments. As used in this application, the terms "component," "module," "system," and the like are intended to refer to a computer-related entity, either hardware, firmware, a combination of hardware and software, software, or software in execution. For example, a component may be, but is not limited to being, a process running on a processor, an integrated circuit, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal and/or a base station. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) may refer to a device in an access network that communicates over the air-interface, through one or more sectors, with wireless terminals. The base station may act as a router between the wireless terminal and the rest of the access network, which may include an Internet Protocol (IP) network, by converting received air-interface frames to IP packets. The base station also coordinates management of attributes for the air interface. Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . smart cards, and flash memory devices (e.g., card, stick, key drive . . . ).

Various embodiments will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The subject matter described herein in its various embodiments addresses a need for a system and method to provide an indication of a gap in the transmission, so that the access point and access terminal do not interpret the gap in transmission as indication of not requiring the assigned resources or as an indication that the assigned resources were no longer available. This facilitates a more optimal utilization of available bandwidth when resources remain temporarily inactive during persistent assignments.

Referring now to the drawings, FIG. 1 is an illustration of a wireless multiple-access communication system 100 in accordance with various aspects. In one example, the wireless multiple-access communication system 100 includes multiple access points (APs) 110 and multiple access terminals (ATs) 120. A base station may also be called, and may contain some or all of the functionality of, an access point, a Node B, and/or some other network entity. Each access point 110 provides communication coverage for a particular geographic area 102. The term "cell" can refer to an access point and/or its coverage area depending on the context in which the term is used. To improve system capacity, an access terminal coverage area may be partitioned into multiple smaller areas, e.g., three smaller areas 104a, 104b, and 104c. Each smaller area is served by a respective base transceiver subsystem (BTS). The term "sector" can refer to an AP and/or its coverage area depending on the context in which the term is used. For a sectorized cell, the APs for all sectors of that cell are typically co-located within the base station for the cell. The signaling transmission techniques described herein may be used for a system with sectorized cells as well as a system with un-sectorized cells. For simplicity, in the following description, the term "base station" is used generically for a station that serves a sector as well as a station that serves a cell.

Terminals 120 are typically dispersed throughout the system, and each terminal may be fixed or mobile. A terminal may also be called, and may contain some or all of the functionality of, a mobile station, a user equipment, and/or some other device. A terminal may be a wireless device, a cellular phone, a personal digital assistant (PDA), a wireless modem card, and so on. A terminal may communicate with zero, one, or multiple base stations on the forward and reverse links at any given moment.

For a centralized architecture, a system controller 130 couples to APs 110 and provides coordination and control for these base stations. System controller 130 may be a single network entity or a collection of network entities. For a distributed architecture, the APs may communicate with one another as needed.

The techniques described herein provide using an indication of a gap in transmission for an access terminal having a "persistent assignment" for other access terminals to receive or transmit signals to improve throughput for other access terminals. Persistent assignments allow the system controller 130, to reduce assignment overhead. Persistent assignments allow the recipient of a given resource to use the assigned resource to perform multiple communications (transmission or reception) without requesting a new assignment for each communication. Using an assignment message, the AP 110 provides resource assignment information, for example a channel identification, to the AT 120. Once, the assignment information is received, the AT 120 transmits actual data on the assigned reverse link channel or receives actual data on the assigned forward link assignment (resource). In a persistent assignment, the assigned channel continues to be assigned to the AT 120. Thus, at various times during the period that a channel is assigned, no actual data is transmitted or received by the AT 120 or the AP 110. Therefore, a first data pattern, which may be an erasure signature packet, is used to fill in the gaps in transmission. The length, the construction and the data rate of the erasure signature packet can vary based on available resources. Available resources can be determined by the system controller 130 or the AP that is in communication with the AT. For example, if the receiving entity has the resources to process erasure signature packets having more information bits (for example, 3 bits), the length of erasure signature packet is adjusted to provide more information bits. This may allow the receiving entity to easily determine that the packet received was an erasure signature packet. Also, the power level at which the erasure signature packets are transmitted may vary in order to transmit the erasure sequence at power level low enough that transmission of the erasure sequence does not cause significant interference.

Further, in certain aspects, other ATs than the one that is intended to receive the first data pattern can read the first data pattern. These ATs can then utilize the resources that are not being used by the AT for which the first data pattern was intended. In certain aspects, a map or similar information is transmitted to allow certain of the other Access Terminals to utilize the appropriate other resources. This map, or other information, can be transmitted as part of a control channel transmission, and may be broadcast, to all sector or cell access terminals, or may be multi-cast to the a subset of the access terminals, e.g. those that will receive information over these resources.

As used herein, resources or communication resources may refer to a carrier frequency, time slot, an number of tones or subcarriers of an OFDMA system, one or more contiguous blocks of OFDM symbols and subcarriers, e.g. block of 8 symbols by 16 subcarriers, a group of non-contiguous combinations of OFDM symbols and subcarriers, OFDM time-frequency allocations, a logical resource, e.g. a node of a channel tree or a frequency hop sequence, or any other resource.

Figure 2:
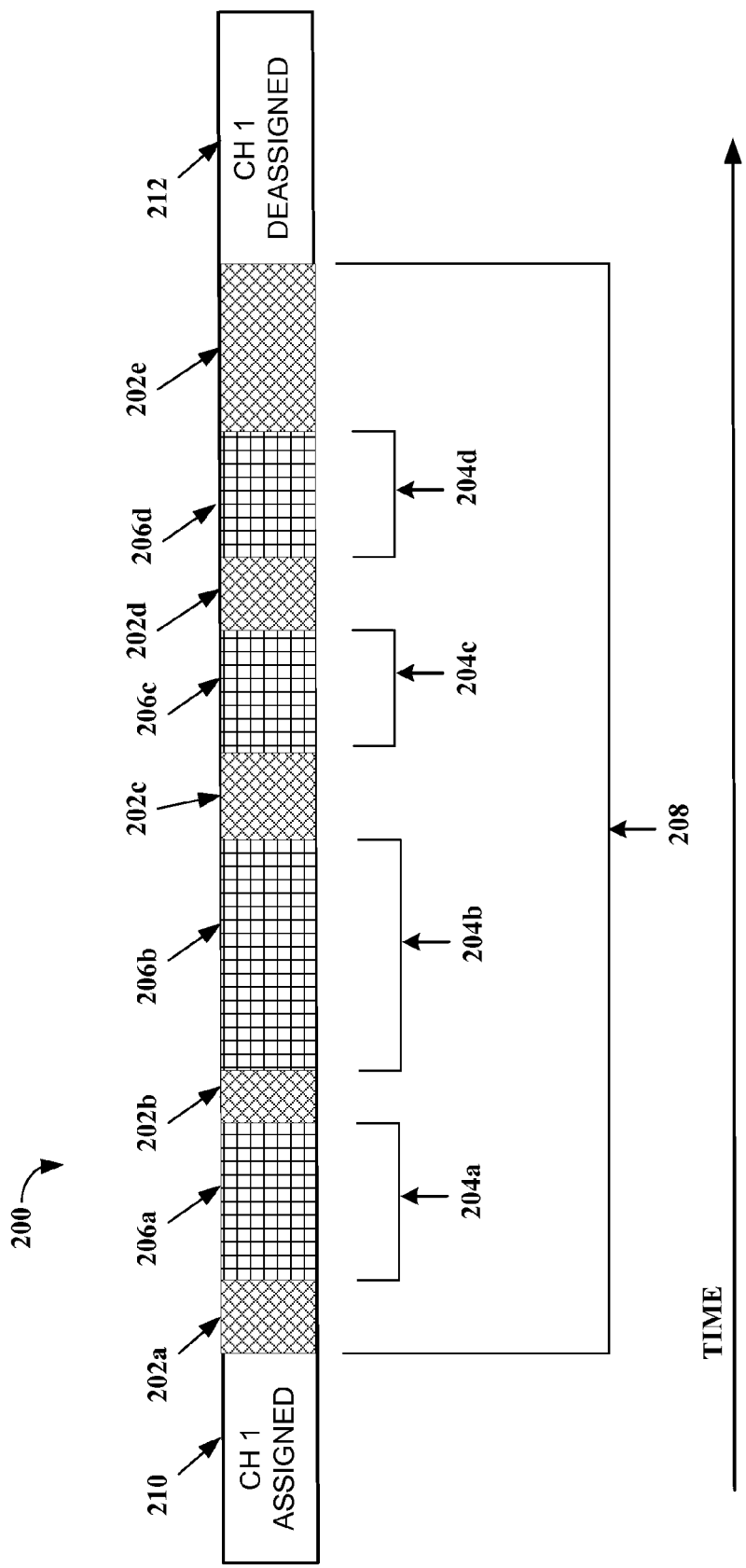
FIG. 2 shows an illustration of data traffic on an assigned channel during the use of a persistent assignment concept.

FIG. 2 shows an illustration 200 of data traffic on an assigned channel during the use of a persistent assignment concept. The persistent assignment duration 208 is generally between an assignment 210 and a deassignment 212, loss of the session, although it may be for a period of fixed duration including multiple transmissions. During the persistent assignment duration 208, there may be several occurrence of transmission of data, for example 202*a*-202*e*, wherein transmit data packets are transmitted. Generally, data is not always transmitted continuously for the duration of persistent assignment 208, thus leaving gap portions, for example, 204*a*-204*d*. A no-information signal 206*a*-206*d* that represents that no transmission is occurring over the resources corresponding to the assignment can be transmitted so that the persistent assignment is not terminated prior to end of the duration 208. The no-information signal may be a fixed erasure signature packet or a message carrying one or more bits representing a unique pattern of data. In other words, the erasure signature packet fills the gap portions 204*a*-*d* with unique patterns and keeps the resources from getting terminated. The erasure signature packet may be a unique identifier that is known to both transmitter and the receiver prior to using the erasure signature packets.

In accordance with other aspects, an Access Point can specify the frames at which a packet begins during configuration, or, via an assignment or other transmission like F-SPCH (Forward Start of Packet Channel). This method can be employed in place of transmitting a no-information signal as detailed supra in order achieve higher power efficiency.

However, in the above situation, the resources subject to the persistent assignment are not being utilized for any communication with the access terminal. Therefore, unused capacity will exist in such situations. Therefore, in some aspects, other access terminals may be conditionally assigned to the resources subject to the persistent assignment. The conditional assignments can be persistent conditional assignments spanning a plurality of communications or can be conditional assignments for a single communication. The conditional assignment, and the persistent assignment, may be for forward link communication, reverse link communication, or both. In some cases some types of terminals and resources will be more likely to be available for conditional assignment, e.g. resources used for voice over internet protocol (VoIP) communication. Further, in some cases, conditionally assigned resources may be partitioned for multiple users, into multiple conditionally assigned resources.

In order to identify resources that are utilized based upon conditional assignments, or access terminals that utilize conditionally assigned resources, a map, or similar information, that indicates which resources are to be utilized by conditionally assigned access terminals, which conditionally assigned access terminals may use conditionally assigned resources, or a combination of both approaches, i.e. some combination of identifying resources and terminals is transmitted from the AP. In this way, multiple access terminals may be subject to conditional assignment, of all or some, of the same resources that are subject to an original persistent assignment. Further, in lieu of or in addition to the map, the no-information signal may identify the access terminal for the persistent assignment, the identification of the sector or access point that is transmitting the no-information signal, or the access terminals that are subject to the conditional assignment. Generally, if other users are conditionally assigned to the resource the no-information signal will not identify the access terminal. The no-information signal may be transmitted at a transmit power level that is lower than a predetermined threshold. The threshold may be predetermined and indicates a transmit power level such that transmitting above the threshold would cause interference. In certain aspects, the no information signal may be a beacon signal, a pseudo-noise (PN) sequence, or some other signal type. Further, in some aspects as described above, the no-information signal may be transmitted over the resources that are conditionally assigned.

Figure 3A:
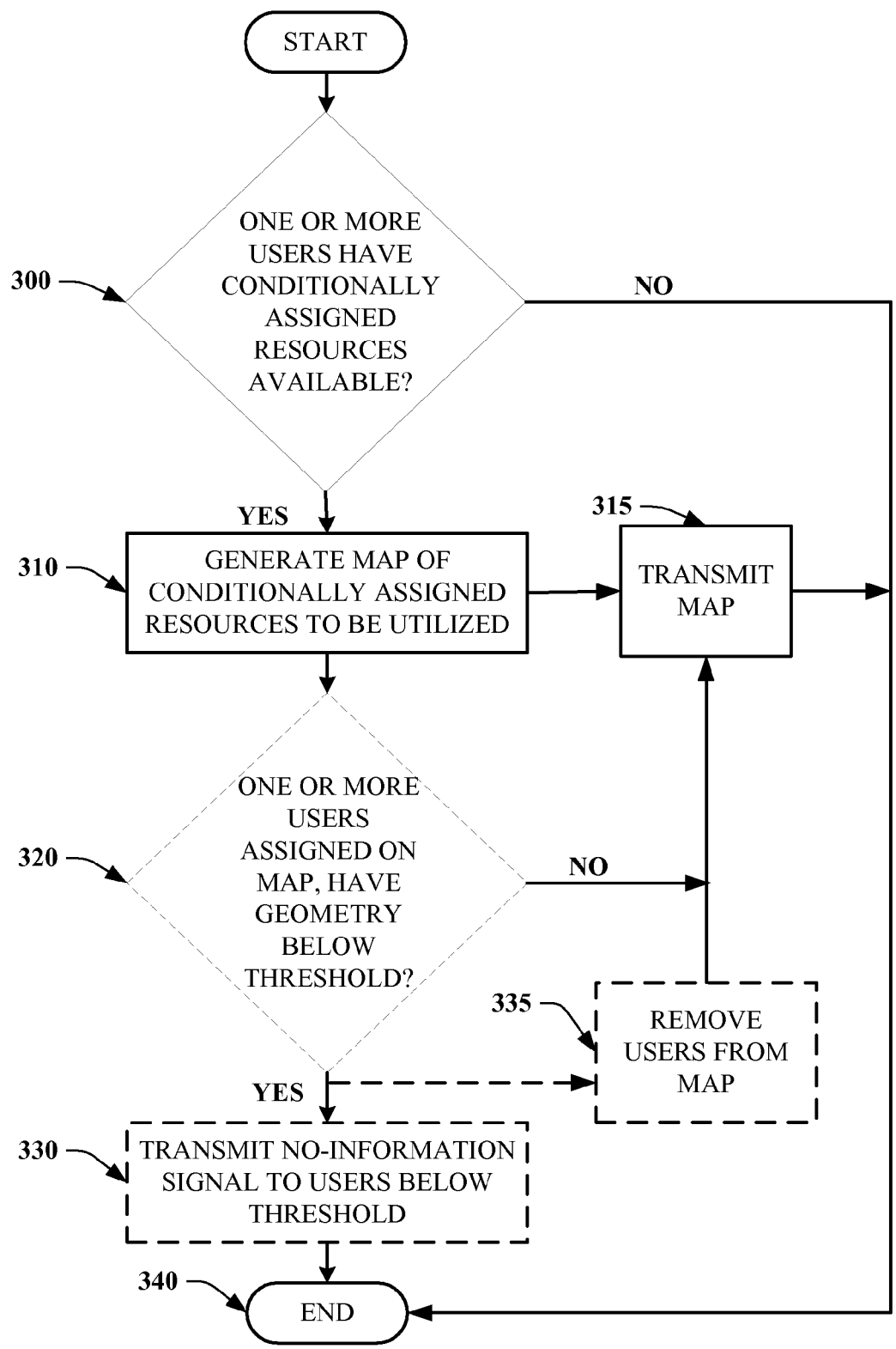
FIG. 3A shows an illustration of a process for generating signals indicative of utilization of conditionally assigned resources.

FIG. 3A shows an illustration of a process for generating signals indicative of utilization of conditionally assigned resources. The resources can be conditionally assigned by an assignment message in the frame, superframe, in an earlier frame and lasting for a fixed duration, or a persistent conditional assignment. A determination is made as to whether any conditionally assigned resources are to be utilized as indicated at block 300. This determination can also include the determination, as to whether any resources will be conditionally assigned. If the terminals have no conditional resources assigned the process reaches the end block as shown at 340. However, if there are such resources, a map, or similar information is generated at 310. The map identifies the terminals or/and resources that are subject to conditional assignment that will be utilized. The generated map is then transmitted, e.g. via a control channel, other channels, direct messages, or combinations thereof as shown at block 315. In addition to this, an optional determination can be made at block 320 as to whether the geometry of the access terminals subject to conditional assignment is below a threshold. This determination can be based upon the channel quality, received signal strength, or other information from pilot and/or, other signals, e.g. channel quality signals, received from that access terminal. Alternatively, or in addition to this, the determination may be based upon channel quality feedback received from the AT. The channel quality feedback may include other information. Further, the determination may be made upon a combination of channel quality feedback and/or pilots, or other information received from the AT. In one aspect, the determination may be based upon the gain for the pilots transmitted from the AT with respect to a threshold.

In another aspect, the determination may be based upon a difference between the reverse link channel qualities of that sector and the reverse link serving sector. In a further aspect, the determination may be based upon the forward, or reverse, link channel quality. For example, those access terminals with a gain of −6 dB or worse may be determined to be below the threshold. For those access terminals, in the map that are below the threshold, an no-information signal may be transmitted on those resources, to indicate that they should utilize the conditionally assigned resource, optional block 330. For those access terminals with geometry above the threshold, the map generated at step 310 is transmitted as indicated at 315, thereby signaling to the terminals which of the conditionally available resources they can use. Further, in some aspects, those users that have the geometry below the threshold may be removed from the map, prior to transmission of the map as indicated at optional block 335.

Figure 3B:
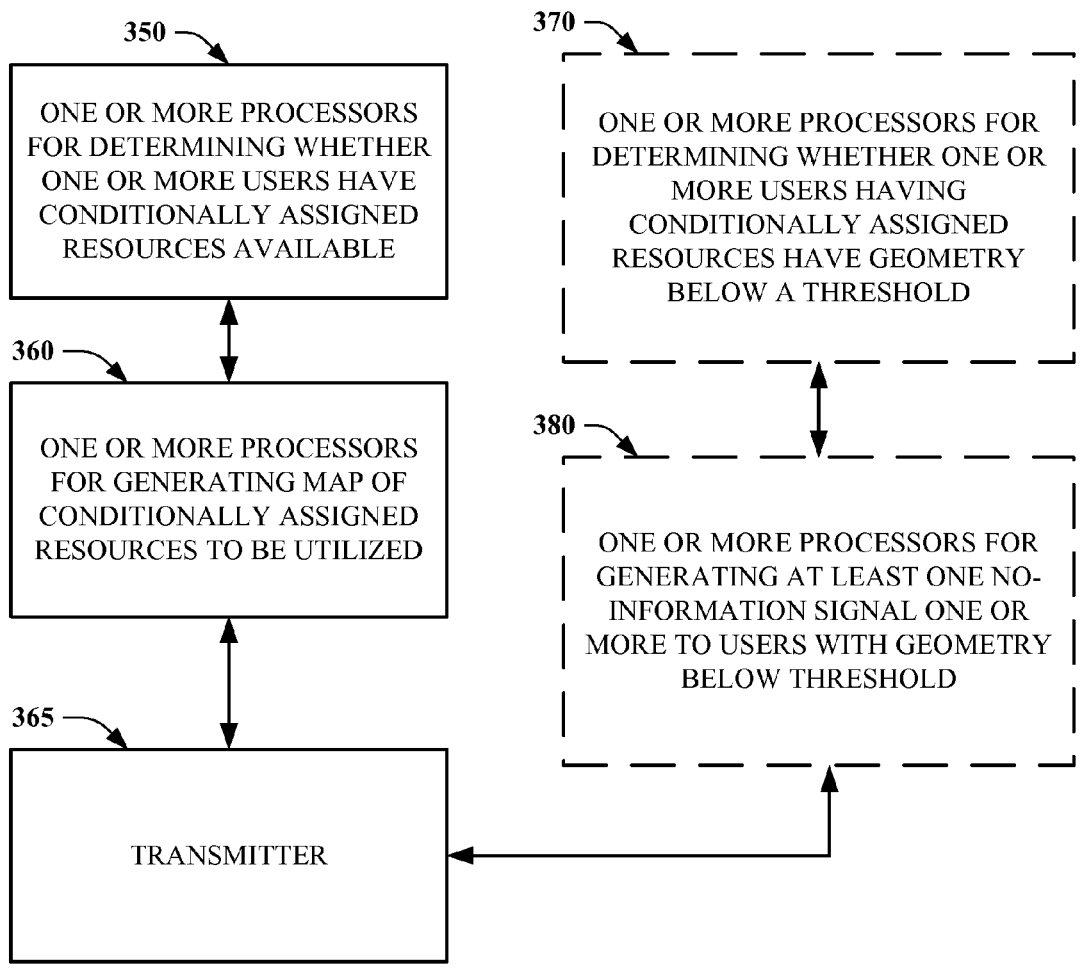
FIG. 3B shows an illustration of an apparatus for assigning access terminals to overlapping resources.

FIG. 3B shows an illustration of an apparatus for assigning access terminals to overlapping resources. One or more processors 350 are configured to determine whether any resources, or terminals, are available to be utilized for conditional assignments. The one or more processors 350 are coupled with one or more processors 360 that generate a map, or similar information, that identifies the resources and, or, terminals that are to utilize the conditional resources. The one or more processors 360 can be coupled to a transmitter, or transmitters, 365 that are used to transmit from the apparatus. In addition, one or more processors 370 are optionally employed for determining whether the geometry of the access terminals subject to conditional assignment is below a threshold. The optional one or more processors 370 can be coupled with optional one or more processors 380 that are configured to generate no-information signals, e.g. erasure signals, to be transmitted on the conditionally assigned resources. The optional one or more processors 380 may be coupled to transmitter, or transmitters, 365.

Figure 4A:
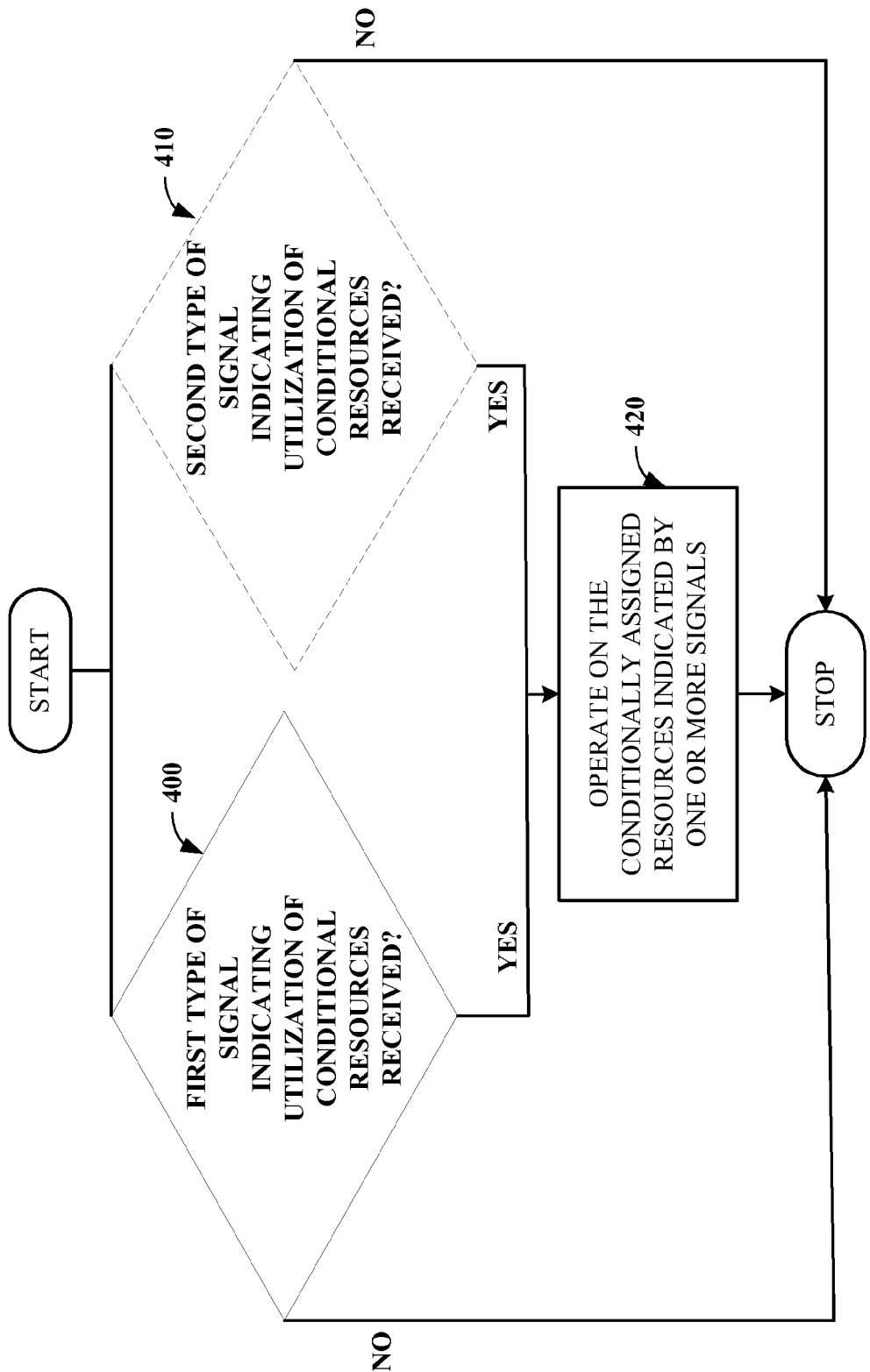
FIG. 4A shows an illustration of a process for determining whether to utilize conditionally assigned resources.

FIG. 4A shows an illustration of a process for determining whether to utilize conditionally assigned resources. The access terminal determines whether it received a first type of signal that indicates that it should utilize a conditionally assigned resource as indicated at block 400. The first type of signal can be a map, or similar information, that indicates that the access terminal should utilize a conditionally assigned resource or that a conditionally assigned resource assigned to the access terminal should be utilized. The determination can also be made by determining whether a location on the map, corresponding to the resource or terminal, is set to active or utilize. An additional, and optional, determination can be made as to whether the access terminal has received a second type of signal that indicates that it should utilize a conditionally assigned resource as shown at block 410. In one aspect, this second type signal may be a no-information signal, e.g. an erasure signal transmitted on the conditionally assigned resource that should be utilized.

If the determination of block 400 or block 410 is positive for first or second received signal type, respectively, the access terminal utilizes the conditionally assigned resource as shown at block 420. In an aspect, utilizing conditional resources can include processing signals received on the conditionally assigned resource, e.g. utilization for forward link communication, or transmitting signals over the conditionally assigned resource, e.g. utilization for reverse link communication. If the determination at both the blocks 400 and 410 is negative it can imply that no conditionally available resources have been assigned to the access terminals.

Figure 4B:
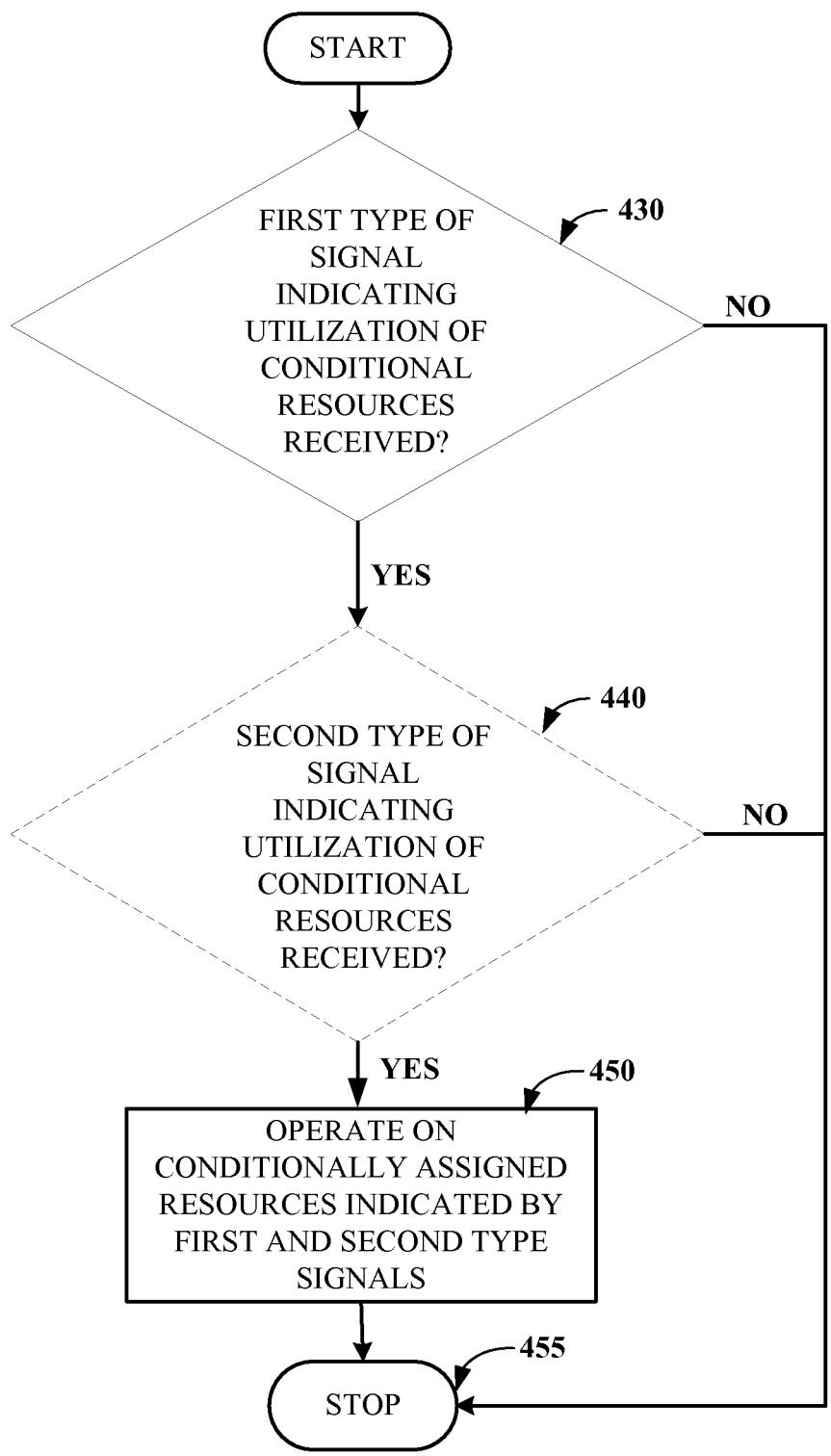
FIG. 4B shows an illustration of another process for determining whether to utilize conditionally assigned resources.

FIG. 4B shows an illustration of another process for determining whether to utilize conditionally assigned resources. The access terminal determines whether it received a first type of signal that indicates that it should utilize a conditionally assigned resource at block 430. The first type of signal can be a map, or similar information, that indicates that the access terminal should utilize a conditionally assigned resource or that a conditionally assigned resource assigned to the access terminal should be utilized. The determination can be made by determining whether a location on the map, corresponding to the resource or terminal, is set to active or utilize. If the determination at block 430 is negative it can signal to the access terminal that no conditional resources have been assigned. If the determination of block 430 is positive, then an optional determination may be made as to whether the access terminal has received a second type of signal that indicates that it should utilize a conditionally assigned resource, block 440. In one aspect, this second type signal may be a no-information signal, e.g. an erasure signal transmitted on the conditionally assigned resource that should be utilized. If the determination of block 440 is positive, after determination of block 430 is positive, the access terminal utilizes the conditionally assigned resource as shown at block 450. In an aspect, utilizing can include processing signals received on the conditionally assigned resource, e.g. utilization for forward link communication, or transmitting signals over the conditionally assigned resource, e.g. utilization for reverse link communication. If the determination at block 440 is negative, it can imply that conditional resources have not been assigned to the terminal and the process reaches a stop block as indicated at 455.

Figure 4C:
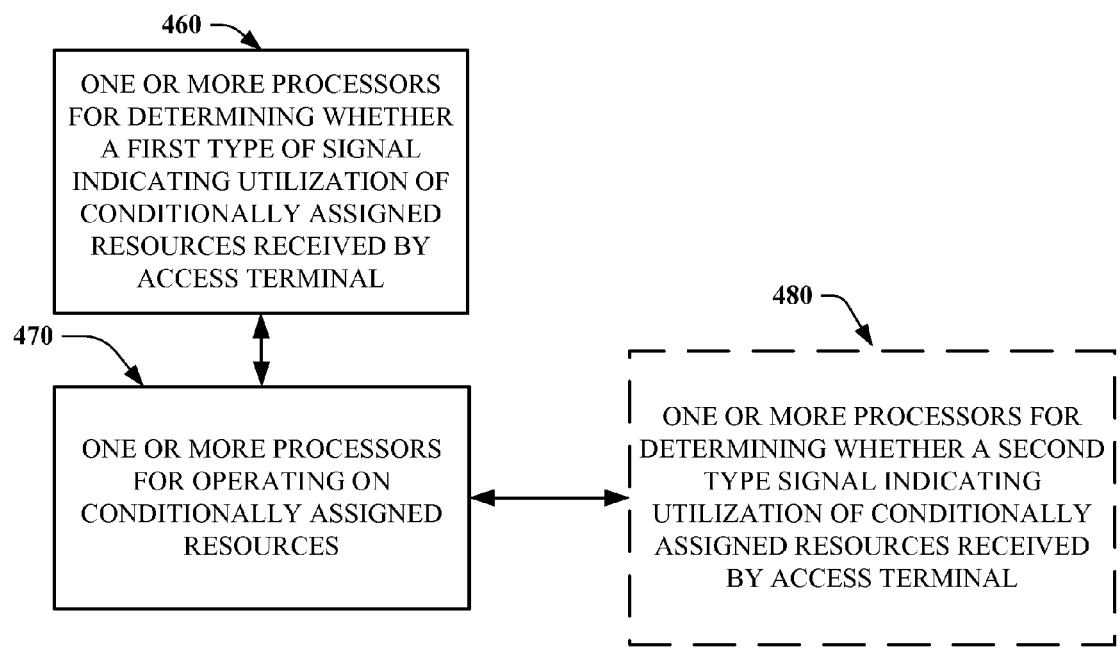
FIG. 4C shows an illustration of an apparatus for determining whether to utilize conditionally assigned resources.

FIG. 4C shows an illustration of an apparatus for determining whether to utilize conditionally assigned resources. One or more processors 460 for determining whether first type signals, e.g. the map indicating the conditionally assigned resources should be utilized or that the access terminal should use the conditionally assigned resources, that indicate that it should utilize a conditionally assigned resource are coupled with one or more processors 470 for instructing utilization of the conditionally assigned resource. The one or more processors are 470 can instruct utilization of the resource by processing signals received on the conditionally assigned resource or transmitting on the conditionally assigned resource. The one or more processors 470 are coupled with one or more optional processors 480 for determining whether the access terminal has received a second type of signal that indicates that a conditionally assigned resource should be utilized. In accordance with an aspect, the second type of signal can be a no-information signal.

Figure 5:
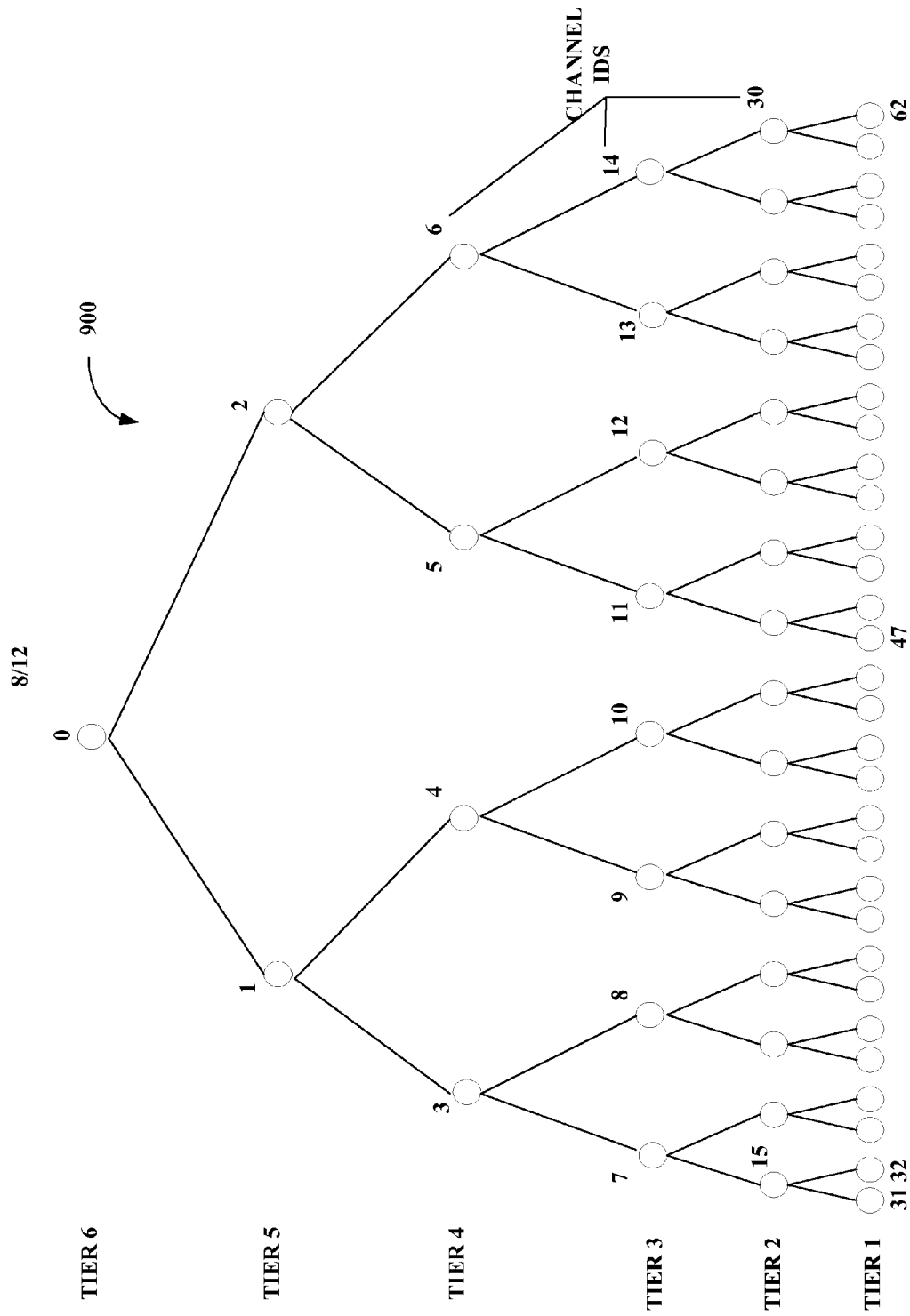
FIG. 5 shows a binary channel tree with 32 subcarrier sets.

FIG. 5 shows a binary channel tree 900 with S=32 subcarrier sets available for use. A set of traffic channels may be defined with the 32 subcarrier sets. Each traffic channel is assigned a unique channel ID and is mapped to one or more subcarrier sets in each time interval. For example, a traffic channel may be defined for each node in channel tree 900. The traffic channels may be sequentially numbered from top to bottom and from left to right for each tier. The largest traffic channel corresponding to the topmost node is assigned a channel ID of 0 and is mapped to all 32 subcarrier sets. The 32 traffic channels in the lowest tier 1 have channel IDs of 31 through 62 and are called base traffic channels. Each base traffic channel is mapped to one subcarrier set. The tree structure shown in FIG. 5 places certain restrictions on the use of the traffic channels for an orthogonal system. For each traffic channel that is assigned, all traffic channels that are subsets (or descendants) of the assigned traffic channel and all traffic channels for which the assigned traffic channel is a subset are restricted. The restricted traffic channels are not used concurrently with the assigned traffic channel so that no two traffic channels use the same subcarrier set at the same time.

In an aspect, an ACK (Acknowledgement) resource is assigned to each traffic channel that is assigned for use. In accordance with various aspects, an ACK resource may be labeled by various terminologies, for example, it can be called an ACK sub-channel. An ACK resource includes pertinent resources (e.g., a spreading code and a set of clusters) used to send an ACK message. In one aspect, the ACK messages for each traffic channel may be sent on the assigned ACK resource. The assigned ACK resources may be signaled to the terminal. In another aspect, an ACK resource is associated with each of the base traffic channels in the lowest tier of a channel tree. This aspect allows for assignment of the maximum number of traffic channels of the minimum size. A larger traffic channel corresponding to a node above the lowest tier may use (1) the ACK resources for all base traffic channels under the larger traffic channel, (2) the ACK resource for one of the base traffic channels, e.g., the base traffic channel with the lowest channel ID, or (3) the ACK resources for a subset of the base traffic channels under the larger traffic channel. For options (1) and (3) above, an ACK message for the larger traffic channel may be sent using multiple ACK resources to improve the likelihood of correct reception. If multiple packets are sent in parallel, e.g., using multiple-input multiple-output (MIMO) transmission, then a larger traffic channel with multiple base traffic channels may be assigned for the transmission. The number of base traffic channels is equal to or greater than the number of packets. Each packet may be mapped to a different base traffic channel. The ACK for each packet may then be sent using the ACK resource for the associated base traffic channel.

An access terminal for a conditional assignment can in some aspects, transmit its ACK as if it were assigned to the resource, e.g. by transmitting an ACK on the lowest base node for the resource that was conditionally assigned. It should be noted that acknowledgements transmitted by a conditionally assigned access terminal for data received over conditionally assigned resources may be provided without a channelized acknowledgement. For example, using a common acknowledgement or signaling channel for all access terminals or groups of access terminals.

FIG. 6 shows an illustration of bit-map for indicating utilization of conditional assignments. The map of FIG. 6 includes one bit b1 to b32 for each resource. The resource can be a time-frequency allocation in an OFDM (Orthogonal Frequency-Division Multiplexing) system, e.g. a tile of 16 tones by 8 OFDM symbols, a node on a channel tree, e.g. the channel tree of FIG. 5, or some other resource. The actual resources and their size may vary from what is shown in FIG. 6. Also, the number of positions on the map, which may or may not be bits, correspond to access terminals, in lieu of resources. Further, the locations on the map can be set in a predetermined pattern that allows for simple decoding by access terminals. In addition, it should be noted that the map may be used in lieu of no-information signals to indicate continuation of primary persistent assignments. Further, the map may be broadcast or multi-cast to those access terminals that are to utilize, or continue assignments on, the conditionally assigned resources.

In certain aspects, the conditionally assigned resources result in residual resource assignment (RRA) wherein resources that are temporarily inactive during a persistent assignment to a first access terminal are conditionally assigned to other users/access terminals during the idle time. For example, in UMB (Ultra Mobile Broadband) systems, the other access terminals receive a bitmap regarding RRA from the AP. The bitmap indicates which of the resources are inactive and which of these resources are available to be utilized by the other terminals. The other terminals determine available resources utilizing the value of bits within the bitmap. Generally, the aforementioned geometry criteria are employed to decide which of the ATs receive conditional assignments or RRA. Once an AT receives such an assignment, the bitmap comprising information about the assignment needs to be transmitted to the AT. If however, this bitmap cannot be transmitted, a packet error occurs and the conditional assignment is lost.

Figure 7A:
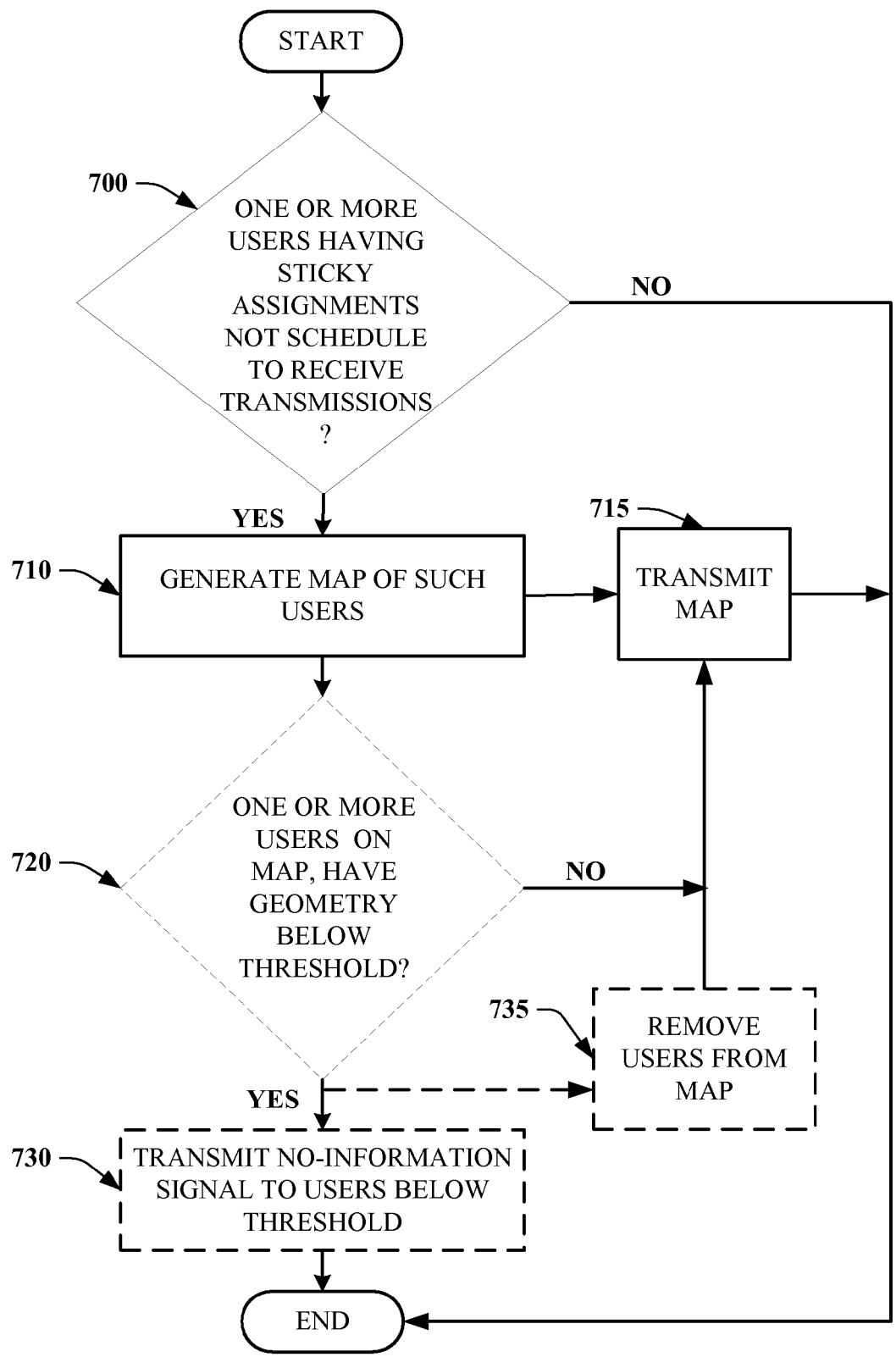
FIG. 7A is an illustration of a process for generating signals indicative of transmission gaps for resources subject to persistent assignments.

FIG. 7A shows an illustration of a process for generating signals indicative of transmission gaps for resources subject to persistent assignments. A determination is made as to whether one or more users have persistent assignments and are not scheduled to receive transmission during relevant time period, block 700. The time period may be a frame, a superframe, a fixed time duration, or based upon other criteria. If there are such users, a map, or similar information, which identifies the terminals, is generated at block 710. The generated map is then transmitted, e.g. via a control channel, other channels, direct messages, or combinations thereof, block 715. In addition to this, an optional determination can be made as to whether the terminals that have persistent assignments and are not scheduled to receive transmission during relevant time period at block 720. This determination may be based upon the channel quality, received signal strength, or other information from pilot and, or, other signals, e.g. channel quality signals, received from that access terminal. Alternatively, or in addition to this, the determination can be based upon channel quality feedback received from the access terminal. The channel quality feedback may include other information. Further, the determination can be made upon a combination of channel quality feedback and/or pilots, or other information received from the access terminal.

In one aspect, the determination can be based upon the gain for the pilots transmitted from the AT with respect to a threshold. In another aspect, the determination can be based upon a difference between the reverse link channel qualities of that sector and the reverse link serving sector. In a further aspect, the determination is based upon the forward, or reverse, link channel quality. For example, those access terminals with a gain of −6 dB or worse may be determined to be below the threshold. For those access terminals, in the map that are below the threshold, an no-information signal may be transmitted on that resources, to indicate that the persistent assignment should be maintained as seen at optional block 730. Often the transmission holes on persistent assignments are generally due to empty buffer. If access terminals have geometry above the threshold, the map generated at step 710 is transmitted as indicated at 715, thereby signaling to such terminals which of the conditionally available resources they can use. Further, in some aspects, those users that have the geometry below the threshold may be removed from the map prior to transmission of the map as shown at optional block 735.

Figure 7B:
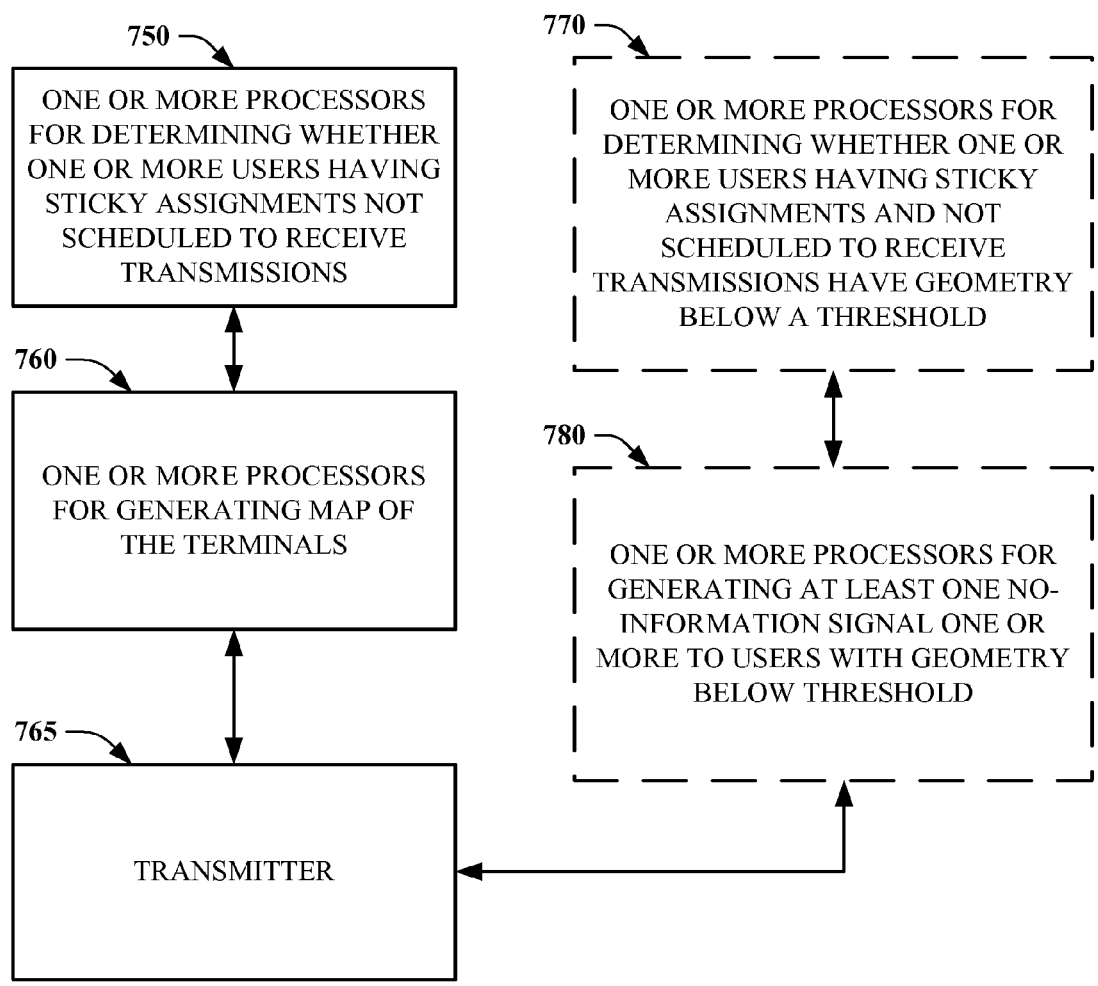
FIG. 7B is an illustration of an apparatus for generating signals indicative of transmission gaps for resources subject to persistent assignments.

FIG. 7B shows an illustration of an apparatus for generating signals indicative of transmission gaps for resources subject to sticky or persistent assignments. One or more processors 750 are configured to determine whether one or more users have persistent assignments and are not scheduled to receive transmission during relevant time period. The one or more processors 750 are coupled with one or more processors 760 that generate a map, or similar information, that identifies the terminals. The one or more processors 760 may be coupled to a transmitter, or transmitters, 765 that are used to transmit form the apparatus.

In addition, optional one or more processors 770 for determining whether the geometry of the access terminals that have persistent assignments and are not scheduled to receive transmission during relevant time period is below a threshold. The optional one or more processors 770 may be coupled with optional one or more processors 780 that are configured to generate no-information signals, e.g. erasure signals, to be transmitted to the terminals. The optional one or more processors 780 may be coupled to transmitter, or transmitters, 765.

Figure 8:
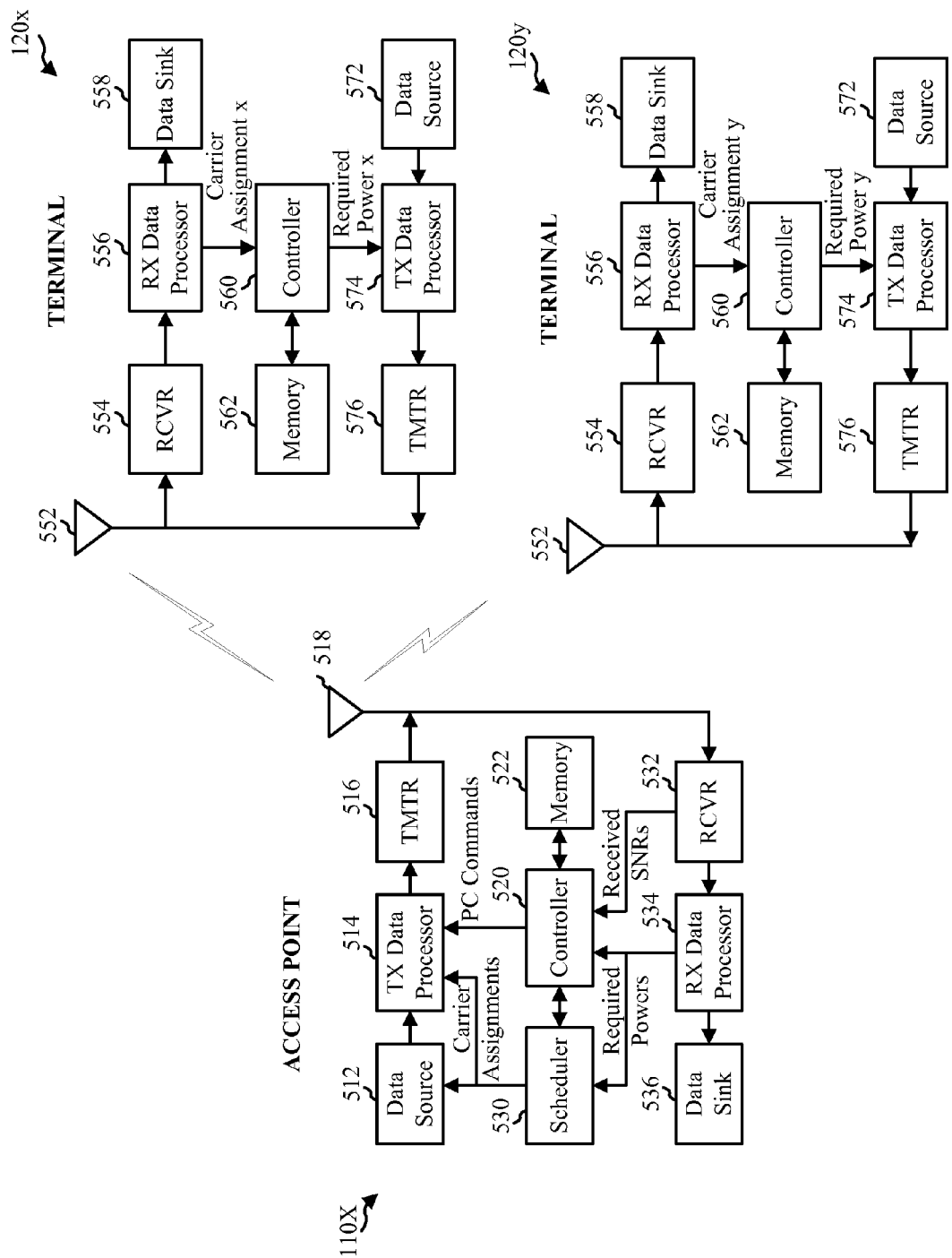
FIG. 8 shows a block diagram of an embodiment of an AP and two ATs in multiple-access multi-carrier communication system.

FIG. 8 shows a block diagram of an embodiment of an AP 110x and two ATs 120x and 120y in multiple-access multi-carrier communication system 100. At AP 110x, a transmit (TX) data processor 514 receives traffic data (i.e., information bits) from a data source 512 and signaling and other information from a controller 520 and a scheduler 530. For example, controller 520 can provide power control (PC) commands that are used to adjust the transmit power of the active ATs, and scheduler 530 may provide assignments of carriers for the ATs. These various types of data may be sent on different transport channels. TX data processor 514 encodes and modulates the received data using multi-carrier modulation (e.g., OFDM) to provide modulated data (e.g., OFDM symbols). A transmitter unit (TMTR) 516 then processes the modulated data to generate a downlink modulated signal that is then transmitted from an antenna 518. Additionally, a memory 522 can maintain information regarding current or previous assignments and/or power levels.

At each of ATs 120x and 120y, the transmitted and modulated signal is received by an antenna 552 and provided to a receiver unit (RCVR) 554. Receiver unit 554 processes and digitizes the received signal to provide samples. A received (RX) data processor 556 then demodulates and decodes the samples to provide decoded data, which may include recovered traffic data, messages, signaling, and so on. The traffic data may be provided to a data sink 558, and the carrier assignment and PC commands sent for the terminal are provided to a controller 560. Controller 560 directs data transmission on the uplink using the resources that have been assigned to the terminal and indicated in the received assignment. Controller 560 further determines whether a location on the map and, or, no-information signal is received and operates accordingly. A memory 562 can be used to store the received maps and other information facilitating operation of the terminal.

For each active terminal 120, a TX data processor 574 receives traffic data from a data source 572 and signaling and other information from controller 560. For example, controller 560 may provide information indicative of channel quality information, required transmit power, the maximum transmit power, or the difference between the maximum and required transmit powers for the terminal. The various types of data are coded and modulated by TX data processor 574 using the assigned carriers and further processed by a transmitter unit 576 to generate an uplink modulated signal that is then transmitted from antenna 552.

At AP 110x, the transmitted and modulated signals from the ATs are received by antenna 518, processed by a receiver unit 532, and demodulated and decoded by an RX data processor 534. The decoded signals can be provided to a data sink 536. Receiver unit 532 may estimate the received signal quality (e.g., the received signal-to-noise ratio (SNR)) for each terminal and provide this information to controller 520. Controller 520 may then derive the PC commands for each terminal such that the received signal quality for the terminal is maintained within an acceptable range. RX data processor 534 provides the recovered feedback information (e.g., the required transmit power) for each terminal to controller 520 and scheduler 530.

Scheduler 530 can provide an indication to controller 520 to maintain the resources. This indication is provided if more data is scheduled to be transmitted. For the AT 120x, the controller 560 may determine if resources required to be maintained. In certain aspects, controller 520 may perform instructions that provide the functionality of scheduler 530. Further, controller 520 may perform all or some of the functions discussed with respect to FIGS. 1-5 and 7 with respect to the access terminal.

The data transmission techniques described herein may be implemented by various means. For example, these techniques may be implemented in hardware, firmware, software, or a combination thereof. For a hardware implementation, the processing units used for data transmission at a transmitter or data reception at a receiver may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory and executed by a processor. The memory may be implemented within the processor or external to the processor.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A method of assigning resources in a multiple access communication system, comprising:
   determining which of a plurality of resources, selected from a generated map of unutilized conditionally assigned resources, not being currently utilized by a user and subject to conditional assignments are to be utilized by at least one conditional user, wherein the user is assigned a persistent assignment of the plurality of resources, wherein the plurality of resources have persistent assignments spanning multiple communications to one or more access terminals and are subject to conditional assignments to the at least one conditional user based on a determination of a gap in transmission of the one or more access terminals;
   generating a signal indicative of one or more conditional resources from the plurality of resources that are to be utilized by the at least one conditional user; and
   transmitting the signal to at least the conditional user,
   wherein the one or more conditional resources are one or more traffic channels and one or more ACK (acknowledgement) resources assigned to the one or more traffic channels signaled to the at least one conditional user, wherein the traffic channels are idle during the persistent assignment,
   wherein at least one of the traffic channels is a larger traffic channel corresponding to a node above a lowest tier of a channel tree and the ACK resources comprise at least a subset of ACK resources assigned to base traffic channels under the larger traffic channel.

2. The method of claim 1, wherein transmitting the signal comprises transmitting the signal as part of a control channel transmission.

3. The method of claim 1, wherein generating the signal comprises generating a map such that each location of the map corresponds to one of the resources subject to the conditional assignments that are to be utilized by the at least one conditional user.

4. The method of claim 3, wherein the map is a bit-map.

5. The method of claim 3, wherein number of positions on the map correspond to number of conditional users.

6. The method of claim 1, wherein generating the signal comprises generating the signal to include only those conditional users to whom a no-information signal is not transmitted.

7. The method of claim 1, wherein the plurality of resources has the persistent assignment spanning multiple communications to one or more access terminals.

8. The method of claim 1, further comprising determining a gain of each of the at least one conditional user and transmitting a no-information signal to the at least one conditional user based upon the gain.

9. The method of claim 8, wherein determining the gain comprises determining the gain based upon pilots received from the at least one conditional user.

10. The method of claim 8, wherein determining the gain comprises determining the gain based upon channel information received from the at least one conditional user.

11. The method of claim 1, further comprising processing communications received over the one or more conditionally assigned resources from the at least one conditional user.

12. An apparatus for assigning resources in a multiple access communication systems comprising:
   a memory;
   a processor that generates a signal indicative of one or more conditional resources selected from a generated map of a plurality of resources not being currently utilized by a user and subject to a conditional assignment that are to be utilized by at least one conditional user, wherein the user is assigned a persistent assignment of the plurality of resources, wherein the plurality of resources have persistent assignments spanning multiple communications to one or more access terminals and are subject to conditional assignments to the at least one conditional user based on a determination of a gap in transmission of the one or more access terminals; and
   a transmitter that transmits the signal,
   wherein the one or more conditional resources are one or more traffic channels and one or more ACK (acknowledgement) resources assigned to the one or more traffic channels signaled to the at least one conditional user, wherein the traffic channels are idle during the persistent assignment,
   wherein at least one of the traffic channels is a larger traffic channel corresponding to a node above a lowest tier of a channel tree and the ACK resources comprise at least a subset of ACK resources assigned to base traffic channels under the larger traffic channel.

13. The apparatus of claim 12, wherein the processor generates a map such that at least one location of the map corresponds to at least one of the conditional resources and number of positions on the map correspond to one or more conditional users.

14. The apparatus of claim 13, the generated signal comprises only those of one or more conditional users to whom a no-information signal has not been transmitted.

15. The apparatus of claim 12, wherein the map is a bit map.

16. The apparatus of claim 12, wherein the processor determines an approximate location of the at least one conditional user.

17. The apparatus of claim 16, the transmitter transmits the generated signal to the at least one conditional user based upon the approximate location.

18. The apparatus of claim 12, wherein the processor determines a channel quality of the at least one conditional user and instructs selectively transmitting the generated signal to the at least one conditional user based upon the channel quality.

19. The apparatus of claim 12, the ACK resources comprise at least one of a spreading code or a set of clusters employed by the at least one conditional user to send an ACK message.

20. The apparatus of claim 12, the traffic channels are base traffic channels in lowest tier of a channel tree such that each of the base traffic channels is mapped to one subcarrier set.

21. The apparatus of claim 12, at least one of the traffic channels is a larger traffic channel corresponding to a node above a lowest tier of a channel tree and the ACK resources comprise at least all ACK resources assigned to all base traffic channels under the larger traffic channel.

22. The apparatus of claim 12, at least one of the traffic channels is a larger traffic channel corresponding to a node above a lowest tier of a channel tree and the one or more ACK resources utilized to send an ACK comprise an ACK resource assigned to a base traffic channel associated with a lowest channel ID among all channel IDs specified by the generated signal corresponding to a given interlace.

23. A method of assigning resources in a multiple access communication system, comprising:
   receiving a signal indicative of one or more conditionally assigned resources not being currently utilized by a user, selected from a generated map of unutilized conditionally assigned resources, wherein the user is assigned a persistent assignment of the one or more conditionally assigned resources; and
   determining which of the conditionally assigned resources are to be utilized based on the received signal, wherein the plurality of resources have persistent assignments spanning multiple communications to one or more access terminals and are subject to conditional assignments to the at least one conditional user based on a determination of a gap in transmission of the one or more access terminals,
   wherein the one or more conditionally assigned resources are one or more traffic channels and one or more ACK (acknowledgement) resources assigned to the one or more traffic channels signaled to the at least one conditional user, wherein the traffic channels are idle during the persistent assignment,
   wherein at least one of the traffic channels is a larger traffic channel corresponding to a node above a lowest tier of a channel tree and the ACK resources comprise at least a subset of ACK resources assigned to base traffic channels under the larger traffic channel.

24. The method of claim 23, wherein the received signal is a bit-map and the one or more conditionally assigned resources to be utilized are determined based on bits within the bit-map.

25. The method of claim 24, the signal indicates an access terminal conditionally assigned to the resources based on one or more positions on the map which are set in a predetermined pattern.

26. The method of claim 25, the signal indicates the access terminal on the bit-map only if the access terminal has not received a no-information signal.

27. The method of claim 25, the signal is received on an acknowledgement or signaling channel common to a group of access terminals.

28. The method of claim 25, further comprising transmitting signals over the one or more conditionally assigned resources.

29. An apparatus for assigning resources within a multiple access communication system comprising:
   means for generating a signal indicative of one or more conditional resources identified from a plurality of resources not being currently utilized by a user and for utilization by at least one conditional user, selected from a generated map of unutilized conditionally assigned resources, wherein the user is assigned a persistent assignment of the plurality of resources; and
   means for transmitting the signal to at least the conditional user, wherein the plurality of resources have persistent assignments spanning multiple communications to one or more access terminals and are subject to conditional assignments to the at least one conditional user based on a determination of a gap in transmission of the one or more access terminals,
   wherein the one or more conditional resources are one or more traffic channels and one or more ACK (acknowledgement) resources assigned to the one or more traffic channels signaled to the at least one conditional user, wherein the traffic channels are idle during the persistent assignment,
   wherein at least one of the traffic channels is a larger traffic channel corresponding to a node above a lowest tier of a channel tree and the ACK resources comprise at least a subset of ACK resources assigned to base traffic channels under the larger traffic channel.

30. The apparatus of claim 29, wherein the means for generating the signal generates a map such that at least one location of the map corresponds to at least one of the one or more conditional resources and number of positions on the map corresponds to one or more conditional users.

31. The apparatus of claim 30, the generated signal comprises only those of the one or more conditional users to whom a no-information signal has not been transmitted.

32. An apparatus for assigning resources in a multiple access communication system, comprising:
   means for receiving a signal indicative of one or more conditionally assigned resources not being currently utilized by a user, selected from a generated map of unutilized conditionally assigned resources, wherein the user is assigned a persistent assignment of the one or more conditionally assigned resources; and
   means for determining which of the conditionally assigned resources are to be utilized based on the received signal, wherein the plurality of resources have persistent assignments spanning multiple communications to one or more access terminals and are subject to conditional assignments to the at least one conditional user based on a determination of a gap in transmission of the one or more access terminals, wherein the one or more conditionally assigned resources are one or more traffic channels and one or more ACK (acknowledgement) resources assigned to the one or more traffic channels signaled to the at least one conditional user, wherein the traffic channels are idle during the persistent assignment, wherein at least one of the traffic channels is a larger traffic channel corresponding to a node above a lowest tier of a channel tree and the ACK resources comprise at least a subset of ACK resources assigned to base traffic channels under the larger traffic channel.

33. The apparatus of claim 32, the received signal is a bit-map and the conditionally assigned resources to be utilized are determined based on bits within the bit-map.

34. A non-transitory computer readable medium having stored thereon computer executable instructions for carrying out the following acts:

determining which of a plurality of resources, selected from a generated map of unutilized conditionally assigned resources, is not being currently utilized by a user and subject to conditional assignments are to be utilized by at least one conditional user, wherein the user is assigned a persistent assignment of the plurality of resources, wherein the plurality of resources have persistent assignments spanning multiple communications to one or more access terminals and are subject to conditional assignments to the at least one conditional user based on a determination of a gap in transmission of the one or more access terminals;

generating a signal indicative of one or more conditional resources from the plurality of resources that are to be utilized by the at least one conditional user; and transmitting the signal to at least the conditional user, wherein the one or more conditional resources are one or more traffic channels and one or more ACK (acknowledgement) resources assigned to the one or more traffic channels signaled to the at least one conditional user, wherein the traffic channels are idle during the persistent assignment, wherein at least one of the traffic channels is a larger traffic channel corresponding to a node above a lowest tier of a channel tree and the ACK resources comprise at least a subset of ACK resources assigned to base traffic channels under the larger traffic channel.

35. The non-transitory computer readable medium of claim 34, having stored thereon computer executable instructions for generating a map for the signal, such that each location of the map corresponds to one of the resources subject to the conditional assignments that are to be utilized by the at least one conditional user.

36. The non-transitory computer readable medium of claim 34, the plurality of resources subjected to conditional assignments are a plurality of traffic channels with a plurality of ACK resources associated therewith.

37. The non-transitory computer readable medium of claim 36, further comprising instructions to send multiple ACK messages if at least one of the traffic channels is a larger traffic channel having at least two of the plurality of ACK resources associated therewith.

38. The non-transitory computer readable medium of claim 36, further comprising instructions to use a larger traffic channel with multiple base traffic channels for a multiple input multiple output (MIMO) transmission.

39. A non-transitory computer readable medium having stored thereon computer executable instructions for carrying out the following acts:

receiving a signal indicative of one or more conditionally assigned residual resources, selected from a generated map of unutilized conditionally assigned resources, that is currently not being utilized by a user, wherein the user is assigned a persistent assignment of the one or more conditionally assigned residual resources, wherein the plurality of resources have persistent assignments spanning multiple communications to one or more access terminals and are subject to conditional assignments to the at least one conditional user based on a determination of a gap in transmission of the one or more access terminals; and determining which of the conditionally assigned resources are to be utilized based on the received signal, wherein the one or more conditionally assigned residual resources are one or more traffic channels and one or more ACK (acknowledgement) resources assigned to the one or more traffic channels signaled to the at least one conditional user, wherein the traffic channels are idle during the persistent assignment, wherein at least one of the traffic channels is a larger traffic channel corresponding to a node above a lowest tier of a channel tree and the ACK resources comprise at least a subset of ACK resources assigned to base traffic channels under the larger traffic channel.

40. The non-transitory computer readable medium of claim 39, wherein the received signal is a bit-map and the residual resources to be utilized are determined based on bits within the bit-map.

41. The non-transitory computer readable medium of claim 40, further comprising instructions for setting one or more positions on the map in a predetermined pattern to indicate an access terminal conditionally assigned to the residual resources.

42. The non-transitory computer readable medium of claim 41, the residual resources comprise resources that are temporarily inactive during the persistent assignment to a first access terminal and are conditionally assigned to other users/access terminals during idle time.

43. The non-transitory computer readable medium of claim 41, further comprising instructions to transmit an ACK on an ACK resource associated with a lowest channel ID among all channel IDs indicated by the map corresponding to a given interlace.

44. An apparatus for assigning resources in a multiple access communication systems comprising:

a memory;

a receiver that receives a signal indicative of one or more conditionally assigned resources not being currently utilized by a user, selected from a generated map of unutilized conditionally assigned resources, wherein the user is assigned a persistent assignment of the one or more conditionally assigned resources; and a processor that determines which of the conditionally assigned resources are to be utilized based on the received signal, wherein the plurality of resources have persistent assignments spanning multiple communications to one or more access terminals and are subject to conditional assignments to the at least one conditional user based on a determination of a gap in transmission of the one or more access terminals, wherein the one or more conditionally assigned resources are one or more traffic channels and one or more ACK (acknowledgement) resources assigned to the one or more traffic channels signaled to the at least one conditional user, wherein the traffic channels are idle during the persistent assignment, wherein at least one of the traffic channels is a larger traffic channel corresponding to a node above a lowest tier of a channel tree and the ACK resources comprise at least a subset of ACK resources assigned to base traffic channels under the larger traffic channel.

* * * * *